United States Patent
Langrick et al.

(10) Patent No.: US 10,858,480 B2
(45) Date of Patent: Dec. 8, 2020

(54) POLYMER PREPARATION

(71) Applicant: INVISTA NORTH AMERICA S.A R.L., Wilmington, DE (US)

(72) Inventors: Charles Richard Langrick, Middlesbrough (GB); Garry S. Hunt, Yearby (GB)

(73) Assignee: INVISTA North America S.a.r.l., Wilmington, DE (US)

( * ) Notice: Subject to any disclaimer, the term of this patent is extended or adjusted under 35 U.S.C. 154(b) by 152 days.

(21) Appl. No.: 15/780,373

(22) PCT Filed: Nov. 11, 2016

(86) PCT No.: PCT/US2016/061604
§ 371 (c)(1),
(2) Date: May 31, 2018

(87) PCT Pub. No.: WO2017/095608
PCT Pub. Date: Jun. 8, 2017

(65) Prior Publication Data
US 2018/0362713 A1    Dec. 20, 2018

Related U.S. Application Data

(60) Provisional application No. 62/261,942, filed on Dec. 2, 2015.

(51) Int. Cl.
| | | |
|---|---|---|
| C08G 69/40 | (2006.01) | |
| C08G 69/28 | (2006.01) | |
| C08K 5/092 | (2006.01) | |
| C08G 69/46 | (2006.01) | |
| C08G 69/04 | (2006.01) | |
| C08G 69/02 | (2006.01) | |
| C08G 69/26 | (2006.01) | |
| C08G 69/48 | (2006.01) | |
| B29B 9/06 | (2006.01) | |
| B29K 77/00 | (2006.01) | |

(52) U.S. Cl.
CPC ............ *C08G 69/40* (2013.01); *C08K 5/092* (2013.01); *B29B 9/065* (2013.01); *B29K 2077/00* (2013.01); *C08G 69/02* (2013.01); *C08G 69/04* (2013.01); *C08G 69/26* (2013.01); *C08G 69/28* (2013.01); *C08G 69/46* (2013.01); *C08G 69/48* (2013.01)

(58) Field of Classification Search
None
See application file for complete search history.

(56) References Cited

U.S. PATENT DOCUMENTS

| | | |
|---|---|---|
| 5,635,589 A | 6/1997 | Tynan |
| 5,810,890 A | 9/1998 | Russ et al. |
| 6,254,374 B1 | 7/2001 | Hatfield |
| 6,855,425 B2 | 2/2005 | Lancaster |
| 6,869,453 B1 | 3/2005 | Lewis et al. |
| 8,859,816 B2 | 10/2014 | Lomel |
| 2012/0065362 A1 | 3/2012 | Amey |
| 2015/0191569 A1* | 7/2015 | Lagneaux ............ B29C 48/022 528/336 |
| 2016/0168759 A1* | 6/2016 | Grassi .................. D01F 6/82 428/221 |

FOREIGN PATENT DOCUMENTS

| | | |
|---|---|---|
| JP | H03-081326 A | 4/1991 |
| JP | H11-503778 A | 3/1999 |
| JP | 2015-522703 A | 8/2015 |
| WO | 2014057363 A1 | 4/2014 |
| WO | 2015/001515 A1 | 1/2015 |
| WO | 2016/030764 A2 | 3/2016 |
| WO | 2017/095608 A1 | 6/2017 |

OTHER PUBLICATIONS

Jahnke; Tamera, "Nylon Plastics Handbook Edited by Melvin I. Kohan", Journal of the American Chemical Society, vol. 118, No. 34, 1996, 631 pages.
International Search Report and Written Opinion Received for PCT Patent Application No. PCT/US2016/061604, dated Feb. 15, 2017, 11 pages.
International Application No. PCT/US15/47742, filed on Aug. 31, 2015, 35 pages.

* cited by examiner

*Primary Examiner* — Richard A Huhn
(74) *Attorney, Agent, or Firm* — Invista North America S.A.R.L.

(57) ABSTRACT

The present disclosure relates to a preparation of polymer with improved color and properties. More particularly, the disclosure relates to the preparation of polyamide by introducing a polyetheramine additive during the polymer extrusion step. The extruded polymer is superior in appearance and spinnable in subsequent processing into yarn.

13 Claims, No Drawings

POLYMER PREPARATION

FIELD

Disclosed is a method for making polymer with improved color and properties. More particularly, the disclosure relates to the preparation of polyamide by introducing a polyetheramine additive during the polymer extrusion step. The extruded polymer, thus formed, is spinnable in subsequent processing into yarn.

BACKGROUND

Over the years there have been a number of approaches to incorporate polyether segments into polyamides with the objective of improving the properties of yarns made from such polyamides. The desired property of hydrophilicity in nylon yarns for use in apparel applications is often imparted through incorporation of oxyethylene ($-OCH_2CH_2-$) repeat units.

Polyamide synthesis can be carried out in individual batch runs, a sequential series of batch runs or continuously. Autoclaves are often used for batch processing. Continuous polymerization can be carried out in various devices including tubular reactors, continuously agitated reactors and screw extruders.

U.S. Pat. No. 5,635,589 discloses a method for making condensation polymers using counter-rotating perforated cylinders for agitation, along with an inert gas sweep at low pressure and high velocity for improving conversion rate.

U.S. Pat. No. 6,254,374 discloses a grooved feed extruder with a crammer feeder for charging feed to the inlet throat of a screw extruder for processing polymer suitable for making film.

U.S. Pat. No. 8,859,816 discloses a method for making polyamide in which an inert gas flows parallel to the flow of a liquid reactant phase.

U.S. Published Application 2015/019569 discloses a method for making polyamide with a plurality of charge points for inert gas and draw points characterized by negative pressure.

International Application Publication No. WO2014/057363A1 teaches a method for introducing hydrophilic functionality into a polyamide by reactive incorporation of hydrophilic additive such as up to 15 wt % of a hydrophilic polyetherdiamine during the substantial part of the polymerization process. Examples of such additives include Elastamine® RE-2000 polyetheramine monomer and Jeffamine® ED-20013. Scale-up tests have revealed that the initial polymerization cycles can trigger foaming from the increased steam release under certain process conditions. Thus it would be desirable to provide a commercially acceptable process wherein excessive foam/froth could be managed.

One approach to incorporating a desired functionality into a polyamide copolymer has been to add the monomer at the first cycle, known as the salt stage, together with most other additives at the beginning of the polymerization process. The polymerization process then continues in multiple cycles where the pressure and temperature conditions are carefully adjusted to effectively remove the water (as steam) whilst keeping the system in a fluid state. When polyetherdiamines are added to the reaction mixture at the beginning of polymerization, excessive foaming is observed under certain process conditions.

PCT/US2015/047742 discloses another approach of introducing such additives has been delayed addition in the later polymerization cycles where the water content is substantially low. This approach alleviates the problem of foaming to some extent, but the proper mixing and incorporation of the additive is often faced with the increased viscosity of the polymer melt.

International Application Publication No. WO2015/001515 discloses a process for making yarn from polyamide that has been modified with a polyetheramine.

A commercial process is therefore desirable to introduce functional additives while mitigating the problems of foaming and handling high melt viscosity regimes. It would be desirable for the process to incorporate the additive into the finished polymer composition, especially a spinnable polyamide composition suitable for subsequent processing into yarn.

SUMMARY

Disclosed is a process for making polyamide comprising:
a. feeding a first diacid and a diamine to a first feed throat of a screw extruder, the screw extruder comprising a first melt zone and a first melt conveying zone downstream of the first feed throat;
b. at least partially polymerizing the diacid and the diamine to form a first polyamide;
c. feeding a polyetheramine additive, and optionally, a second diacid, to a second feed throat of the screw extruder downstream of the first melt conveying zone;
d. incorporating polyetheramine additive, and if added, the second diacid, with the first polyamide in a second melt zone and a second melt conveying zone; and
e. recovering a second polyamide from the screw extruder downstream from the second melt conveying zone, wherein:
   i. the RV of the second polyamide using the ASTM D789 method is from about 20 to about 60; the amino end group (AEG) content is between about 15 mpmg and 130 mpmg, or
   ii. the water regain per unit weight of the second polyamide is greater than the water regain per unit weight of the first polyamide.

The polyetheramine additive can be less thermally stable than the first polyamide. The water regain of the second polyamide can be greater than the water regain of the first polyamide. For example, the water regain of the second polyamide can range from about 6 wt % to about 30 wt %, for example, from about 10 wt % to about 15 wt %.

The process can include injecting one or more additives. The additives can be injected at one or more of the first feed throat, the second feed throat or at one or more additive injection points downstream of the first or second feed throats. At least one such additive can be a catalyst, and can optionally be added with the polyetheramine. The catalyst can also be added separately.

The catalyst can be chosen from a group consisting of phosphoric acid, phosphorous acid, hypophosphoric acid arylphosphonic acids, arylphosphinic acids, salts thereof, and mixtures thereof.

The catalyst can also be selected from a group consisting of sodium hypophosphite hydrate (SHP), manganese hypophosphite, sodium phenylphosphinate, sodium phenylphosphonate, potassium phenylphosphinate, potassium phenylphosphonate, hexamethylenediammonium bis-phenylphosphinate, potassium tolylphosphinate, and mixtures thereof.

The additive can comprise an antioxidant or heat stabilizer. For example, the additive can comprise a dicarboxylic acid such as adipic acid.

Feeds for the disclosed process can comprise diacids and diamines as described above, or can comprise at least partially polymerized polyamide. Thus the disclosed process can include a process for making polyamide comprising:

a. feeding a first polyamide to a first feed throat of a screw extruder, the screw extruder comprising a first melt zone and a first melt conveying zone downstream of the first feed throat;

b. feeding a polyetheramine additive to a second feed throat of the screw extruder downstream of the first melt conveying zone;

c. incorporating the polyetheramine additive, and optionally also comprising a second diacid, with the first polyamide in a second melt zone and a second melt conveying zone; and d. recovering a second polyamide from the screw extruder downstream from the second melt conveying zone, wherein:

i. the RV of the second polyamide using the or ASTM D789 method is from about 20 to about 60; the amino end group (AEG) content is between about 15 mpmg and 130 mpmg, or ii. the water regain per unit weight of the second polyamide is greater than the water regain per unit weight of the first polyamide.

The second polyamide can be less yellow than polyamide produced from a similar feed composition when made using conventional batch autoclave or continuous process methods.

The disclosed process can be carried out in any suitable extruder, for example, a screw extruder comprising:

an extruder screw in a barrel, said barrel having a first feed throat at a first end for charging feedstock to contact the extruder screw;

a first melt zone in the barrel sequentially downstream from the first feed throat;

a first melt conveying zone in the barrel sequentially downstream from the first feed throat;

a second feed throat for charging feed to the screw extruder downstream from the first melt conveying zone; and a second melt zone in the barrel sequentially downstream from the second feed throat;

a second melt conveying zone in the barrel sequentially downstream from the second melt zone; and a charge plate for extruding polyamide from the barrel downstream from the second melt conveying zone.

DETAILED DESCRIPTION

The present disclosure relates to a preparation of polymer with improved color and properties. More particularly, the disclosure relates to the preparation of polyamide by introducing a polyetheramine additive during a polymer extrusion step. The extruded polymer is suitable for making fibers that can subsequently be spun into yarn.

The disclosed process provides for effective addition of function additives, for example, additives having hydrophilic functionality, and is suitably carried out in a polymer extrusion stage. The process provides a polyamide including oxyethylene ($-OCH_2CH_2-$) repeating units in the polymer composition. It has been found that adding a polyetheramine, such as Elastamine® RE-2000 amine, during the extrusion stage yields extruded polymer with superior appearance properties and equally acceptable water regain properties.

To appreciate the advantages of the disclosed process, it is worthwhile to refer to a typical commercial polyamide polymerization process, typically carried out in a number of stages. In the Evaporative Stage [on a commercial batch plant typically done in a separate vessel, the Evaporator as well known in the art] the salt concentration of the salt solution is increased from about 50 wt % to around 80-85 wt % by evaporation of much of the water of solution under modest pressure.

Generally, the condensation polymerization can involve various serial heating cycles. Such cycles have been described in Nylon Plastic Handbook; Ed Melvin I Kohan; Hanser; 1995; ISBN 1-56990-189-9, FIG. 2.5 of which shows a typical PA-66 batch polymerization process and details of pressure, melt temperature, % water off (and by inference % water remaining). Such cycles can individually comprise a heating temperature profile and a pressure profile. Generally the intent is to keep the system fluid through a combination of temperature for sufficient melt, and water content for sufficient solubility. The serial heating cycles can comprise: a first heating cycle (C1) having a temperature starting between 170 to 215° C. and finishing between 190 to 230° C. over a period of 20 to 40 minutes under a pressure of between 130 to 300 psia; a second heating cycle (C2) having a temperature starting between 190 to 230° C. and finishing at between 240 to 260° C. over a period of 20 to 45 minutes under a pressure of between 130 to 300 psia; a third heating cycle (C3) having a temperature starting between 240 and 260° C. and finishing between 250 to 320° C. over a period of between 15 to 45 minutes under a pressure of between 300 psia to atmospheric pressure; and a fourth heating cycle (C4) having a temperature starting between 250 to 320° C. and finishing between 250 to 320° C. over a period of 15 to 80 minutes under a pressure of between atmospheric pressure and about 200 mbar absolute vacuum. In Cycle 5 Stage (C5) the vessel is sealed, a slight pressure of Nitrogen introduced and the contents are prepared for discharge out of the autoclave vessel. One bar pressure is equal to 0.987 atmospheres. One atmosphere pressure is equal to 14.7 Psi pressure. The unit mbar means millibar or $10^{-3}$ bar. The unit Psia or psia means Psi absolute. The unit Psig or psig means Psi gauge. The pressure unit "Psi" or "psi" is pounds of force per square inch.

The polymer discharge stage occurs after Cycle 5 stage. The polymer is discharged from the autoclave via a suitable casting outlet, the discharged polymer lace is then typically cooled in water and the cooled lace then chopped into polymer pellets by a cutter. Pellets are convenient for transportation locally or distantly, remelted and further processed in a melt processing device, such as an extruder. Alternatively the discharge from the autoclave may be fed directly into a further melt processing device, such as an extruder. These Stages and the reasons for them are all well known in the art.

The applicants have unexpectedly found that the extrusion stage (with its high-shear turbulence and melt flow conditions) is surprisingly effective for incorporating additive into the polymer composition. While the theoretical mechanism is not fully understood, the extrusion conditions exerted on the polymer melt inside the extruder barrel appear effective for incorporating the additive while avoiding the foaming issues or mixing difficulty in the high viscosity mass. Relatively short residence times in the extrusion stage may be beneficial for minimizing any chemical degradation of the additives from elevated temperature exposure.

The disclosed process can produce polyamide compositions with a formic acid method RV of about 25 to about 60, for example, a formic acid method RV of about 30 to about 55.

The polyamide compositions of the disclosed process are well-suited for making hydrophilic polyamide compositions. As such, the disclosure herein generally also relates to improved synthetic polyamide (nylon) polymer compositions. Generally, the polyamide compositions of the disclosed process comprise a nylon and a polyetheramine. As used herein, the term. "composition" refers to a composition which is not a yarn or fiber or is not a textile or fabric or garment containing such a yarn or fiber. Such a composition is, however, suitable for making a yarn or fiber and a textile or fabric or garment containing such yarns or fibers.

Generally, such polyamide compositions comprise a nylon and a polyetheramine and can have a moisture regain ranging (measured as described herein) ranging from about 10% to about 30%. Such regain can allow for improved processability during subsequent processing of the present polyamide compositions. For example, the polyamide composition can have an elongation to break off from 20% to 90% when spun into a yarn. The polyamide composition may be either an acid (anionic) or base (cationic) dyeable polymer, as discussed herein. In one embodiment, at least 85 percent of the polymer backbone (between amide units) can comprise aliphatic groups. The nylon discussed herein can be polyhexamethylene adipamide (nylon 6,6), polycaproamide (nylon 6), or copolymers of either of these. In one embodiment, the nylon can be nylon 6,6. Generally, the nylon can be present in the polyamide composition in an amount ranging from about 50% to 95% by weight.

Suitable polyetheramines include polyetherdiamines, for example a polyetheramine having a weight average molecular weight of at least 1500 and an Amine Hydrogen Equivalent Weight (AHEW, defined below) of less than 10 percent higher than the idealized AHEW for the polyetherdiamine.

Suitable polyetheramines can be made by reacting polyethyleneglycol of molecular weight of about 1500 with typically three to ten molecules of propyleneoxide to ensure a high statistical conversion of the primary terminal hydroxyl groups to secondary hydroxyl ends. The secondary hydroxyl ends are subsequently converted into amine groups. Incomplete conversion of the hydroxyl to amine groups results in a polyetherdiamine product containing residual hydroxyl end groups, such hydroxyl groups are incapable of forming amide groups during a polyamide polymerization process, limiting the rate and degree of polymerization, and are hence undesirable. Such incomplete conversion is reflected in the Amine Hydrogen Equivalent Weight (AHEW) value of the polyetherdiamine being higher than the idealized value. The Technical Data Sheet for Elastamine® RE-2000 amine describes the polyetherdiamine as being a polyetherdiamine of approximate number average molecular weight 2000, hence it has an idealized AHEW of 500 g per equivalent, the datasheet further reports the actual AHEW as being 505 g per equivalent. For comparison, the Technical Data Sheet for Jeffamine® ED-2003 amine describes the polyetherdiamine as being a polyetherdiamine of approximate molecular weight 2000; hence it also has an idealized AHEW of 500 g per equivalent, the datasheet further reports the actual AHEW as being 575 g per equivalent.

The term, Amine Hydrogen Equivalent Weight (AHEW), is defined as the molecular weight of the polyetheramine divided by the number of active amine hydrogen per molecule. For illustration, an idealized polyetherdiamine having a number average molecular weight of 2000 and where all the ends of the polyether were amine ends, hence contributing 4.0 active amine hydrogens per molecule, would have an AHEW of 500 g per equivalent. If, for comparison, 10 percent of the ends were in fact hydroxyl rather than amine, then there would be only 3.6 active amine hydrogens per molecule and the polyetheramine would have an AHEW of 556 g per equivalent. The number of active amine hydrogen per molecule, and therefore the AHEW, of a given polyetheramine can be calculated according to known and conventional techniques in the art, however it is preferably calculated by determining the amine group nitrogen content using the procedure described in ISO 9702.

Polyamide compositions made by the disclosed process generally comprise a polyetheramine with an AHEW less than 10 percent higher than the idealized AHEW for the polyetheramine. The polyetheramine is preferably a polyetherdiamine. In one embodiment, the polyetheramine can be an alkylpolyetheramine. In one aspect, the polyetheramine can include aliphatic groups. In still another aspect, the polyetheramine can be Elastamine® RE-2000 amine (Huntsman International LLC). In one embodiment, the polyetheramine is a polyetherdiamine and can have the following structure:

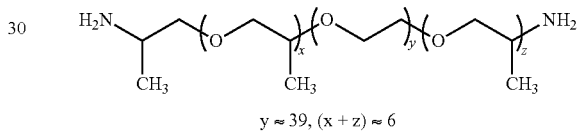

y ≈ 39, (x + z) ≈ 6

Suitable polyetheramines include α,ω-diamino poly(oxyalkylene-co-oxyalkylene ether) copolymer, for example α,ω-diamino poly(oxyethylene-co-oxytetramethylene ether) copolymer, as disclosed in United States Patent Application No. 20120065362A1.

The polyetheramine can optionally be a hydrophobic polyetheramine such as α,ω-diamino poly(tetramethyleneglycol)/poly(prpyleneglycol) copolymer, one commercial example of which is the polyetheramine Elastamine® RT 1000 (Huntsman International LLC).

In a further embodiment, the polyetheramine can be a hydrophobic polyetheramine such as α,ω-diamino poly(propyleneglycol). In one aspect the polyetheramine can be Elastamine® RP-2009 (Huntsman International LLC). In another aspect the polyetheramine can be Elastamine® RP-2005 (Huntsman International LLC).

In a further embodiment, the polyetheramine may incorporate secondary amine functionalities. In one aspect the polyetheramine can be Elastamine® HT-1700 (Huntsman International LLC).

As discussed herein, a polyetherdiamine can be employed in the polymerization of nylon monomers to form a polyamide which may be spun into nylon yarns which exhibit good hydrophilicity properties. Such properties can impart tactile aesthetics and wear comfort highly desired in apparel goods manufactured from these yarns.

Furthermore, the polyetheramines can be present in the polyamide and can have various molecular weights depending upon the desired properties of the resulting polymer, including processability as discussed herein. In one embodiment, the polyetheramine can have a molecular weight of at least 500. In other aspects, the polyetheramine can have a molecular weight of at least 2500, or even at least 5000. Additionally, the polyetheramine can be present in an amount ranging from about 1 wt % to about 20 wt % of the polyamide. In one aspect, the polyetheramine can be present in an amount ranging from about 2 wt % to about 15 wt %, preferably from about 3 wt % to about 15 wt %. In another preferred embodiment, the polyetheramine is present in an amount from about 4 wt % to about 15 wt %.

Additionally, the present polyamides can further comprise a catalyst. In one embodiment, the catalyst can be present in the polyamide in an amount ranging from 10 ppm to 10,000 ppm by weight. In another aspect, the catalyst can be present in an amount ranging from 10 ppm to 1,000 ppm by weight. The catalyst can include, without limitation, phosphoric acid, phosphorous acid, hypophosphoric acid arylphosphonic acids, arylphosphinic acids, salts thereof, and mixtures thereof. In one embodiment, the catalyst can be sodium hypophosphite hydrate (SHP), manganese hypophosphite, sodium phenylphosphinate, sodium phenylphosphonate, potassium phenylphosphinate, potassium phenylphosphonate, hexamethylenediammonium bis-phenylphosphinate, potassium tolylphosphinate, or mixtures thereof.

In one embodiment the catalyst is present in the nylon to which the polyetheramine is added. In another embodiment the catalyst is present in the polyetheramine which is added to the nylon.

The polyamides and polyamide compositions in accordance with the present disclosure may comprise other additive packages, such as antioxidants, antifoaming agents, chain extenders, chain terminators, thermal stabilizers, optical brighteners, delustering agents, antimicrobial agents, lubricating agents, corrosion inhibiting agents, colorants, dyes, etc. Chemicals and compounds used in such additive packages are well-known commercially and are widely practiced in the polymer industry.

The polyamide compositions described herein may further comprise a diacid. In one embodiment, the diacid can be aliphatic diacid containing from 6 to 12 carbon atoms, terephthalic acid, isophthalic acid, and mixtures thereof. In another embodiment, the diacid can be adipic acid. The diacid may be present in the polymer in an amount to give substantially equimolar proportions of acid groups to amine groups of the polyetheramine. In one embodiment the diacid is present and part of the nylon to which the polyetheramine is added. In another embodiment the diacid is present and may be part of the polyetheramine which is added to the nylon. In another embodiment a diacid is present and forms a salt with the polyetheramine which is added to the nylon.

If the polyamide is produced from a diacid, the diacid can be selected from the group consisting of oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexane dicarboxylic acids, 1,2- or 1,3-phenylenediacetic acids, 1,2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid, and mixtures thereof and wherein the diamine is selected from the group consisting of ethanol diamine, trimethylene diamine, putrescine, cadaverine, hexamethyelene diamine, 2-methyl pentamethylene diamine, heptamethylene diamine, 2-methyl hexamethylene diamine, 3-methyl hexamethylene diamine, 2,2-dimethyl pentamethylene diamine, octamethylene diamine, 2,5-dimethyl hexamethylene diamine, nonamethylene diamine, 2,2,4- and 2,4,4-trimethyl hexamethylene diamines, decamethylene diamine, 5-methylnonane diamine, isophorone diamine, undecamethylene diamine, dodecamethylene diamine, 2,2,7,7-tetramethyl octamethylene diamine, bis(p-aminocyclohexyl)methane, bis(aminomethyl)norbornane, C2-C16 aliphatic diamine optionally substituted with one or more C1 to C4 alkyl groups, aliphatic polyether diamines and furanic diamines, such as 2,5-bis(aminomethyl)furan, and mixtures thereof.

The polyamide composition of the present disclosure is particularly useful when spun into yarns. In one embodiment, the polyetheramine can be provided to the polyamide composition, and hence inherent to the yarn itself when formed into a fabric, as opposed to being applied on a fabric. In one embodiment, the yarn exhibits improved hydrophilic properties as measured by various water wicking and moisture regain tests.

In some embodiments, the non-apparel textile yarn spun from the polyamide composition, prepared using the method of the present disclosure, is a textile yarn which is suitable for and limited to making textiles of fabrics other than apparel textiles of apparel fabrics. In other embodiments, the non-apparel textile yarn spun from the polyamide composition, prepared using the method of the present disclosure, is used only in making textiles or fabrics other than apparel textiles or fabrics.

A yarn made from the polyamides described herein can be a multifilament textile yarn in the form of either a low orientation yarn (LOY), a partially oriented yarn (POY) or a fully drawn yarn (FDY). The yarn may be a textured yarn made from partially oriented yarn. Moreover, the yarn may be substantially continuous, i.e., formed by one or more continuous filaments. In other embodiments, a continuous filament can be cut into staple fibers and the latter can be converted into a continuous thread by a spinning process, resulting in a continuous article of manufacture or comprised of shorter fibers. Such yarns may be used to make fabrics, which in turn may be used to make garments.

In one embodiment, apparatuses and methods for spinning yarns are disclosed in U.S. Pat. No. 6,855,425, and similar techniques can be likewise in the context of the polyamides prepared and described herein.

In certain embodiments, the polyamide yarns have different dyeing characteristics with anionic dyes or cationic dyes. These dyeing characteristics may arise from different numbers of amine end groups. The concentration of amino end groups (AEG) influences how deeply the polyamide is dyed by anionic dyes. Alternatively or additionally, the polyamides may contain anionic end groups, such as sulfonate or carboxylate end groups, that render the polyamide cationic-dyeable. The AEG value is measured in the units of how many moles of amino ends are present per one million grams of polymer (mpmg). One million grams equal one tonne.

In certain embodiments, the polyamide yarns are dyed with fiber reactive dyes which incorporate vinylsulfonyl and/or β-sulfatoethylsulfonyl groups. Such fiber reactive dyes are known from U.S. Pat. No. 5,810,890.

In certain embodiments, the polyamide yarns are dyed with fiber reactive dyes which incorporate halogen derivatives of nitrogen hetrocyclic groups, such as, triazine, pyrimidine and quinoxaline. Such fiber reactive dyes are described, for example, in U.S. Pat. No. 6,869,453.

In other embodiments, the filaments comprise an amine component of hexamethylene diamine. In other embodiments, the filaments comprise an amine component which is a mixture of hexamethylene diamine with at least 20 wt % of methyl pentamethylene diamine based on the total weight of diamine. In still other embodiments, the polyamides may comprise nylon 6.

In some embodiments, the polymer composition may be directly supplied to polymer extrusion equipment designed and operated to handle the polymer melt.

In some embodiments, the polymer extrusion equipment may comprise of an internal flow cavity confined by a rigid barrel wall. The internal flow cavity may have an aspect ratio, defined as the ratio of length in the axial direction to diameter [L/D], in the range of about 20 to 70, preferably about 30 to 65, and more preferably about 35 to 60. The internal flow cavity diameter [D] may be in the range of about 16 mm to 400 mm, preferably about 18 mm to 120 mm, and more preferably about 40 to 120 mm.

In some embodiments, the polymer extrusion equipment may comprise of mechanical screws. In another embodiment, the polymer extrusion equipment may comprise of a pair of conveying screws, axially co-rotating in the same direction or counter-rotating in an opposing direction, whereby the polymeric mass experiences a forward shearing push while getting mixed due to the helical screw action. In addition, the configurations of the screws themselves may be varied using forward conveying elements, reverse conveying elements, kneading blocks, mixing elements and other designs in order to achieve particular mixing characteristics well known in the art.

In some embodiments the extrusion equipment may comprise a multitude of parallel axial screws (satellite screws). In one embodiment the extruder is a Gneuss MRS type extruder (Gneuss Kunststofftechnik GmbH).

In some embodiments, the polymer extrusion process may be performed in a linear extruder. In other embodiments, the polymer extrusion process may be performed in an annular extruder. Depending on which extruder design is used, the conveying screws may be positioned next to each other in the same line for linear extrusion or they may be arranged in a circular fashion in the case of annular extrusion. Such designs and other variations are known in the polymer industry.

In some embodiments, the speed of rotation of the conveying screws may generally be in the non-limiting range of about 5 rpm to 1500 rpm, preferably about 150 rpm to about 1200 rpm. The term "rpm" is defined as an angular rotation (or turns) per minute, and as an example, a value of 10 rpm means the screw rotates (or turns) ten times around its linear axis in one minute. It is generally understood that the speed of rotation will depend on the type of the extruder and will be identical for all constitutive screws present in the extruder.

In some embodiments, an axial temperature profile in the extrusion equipment is maintained such as to facilitate the forward movement of the polymer mass. In other embodiments, the axial temperature profile in the extrusion equipment may be held constant. Temperatures in the individual melting melting zones along the extruder barrel may range from 180° C. to 340° C., preferably about 240° C. to 300° C. It is generally understood that such axial temperature profiles may be attained by the use of external jacketing for the extruder barrel. The means of feeding or removing energy is known in the art, for example, steam tracing or electric heat, etc.

In some embodiments, the time that the polymer mass resides while in motion inside the flow cavity of the polymer extruder may be in the range of about 0.5 minutes to about 30.0 minutes, preferably in the range of about 0.5 minutes to about 10.0 minutes, and more preferably in the range of about 0.6 minutes to about 5.0 minutes.

A typical production throughput may depend on the type and dimensions of the polymer extrusion equipment used. It will be understood that the skilled person will have properly designed and scaled up the extrusion equipment for desired production throughput.

In some embodiments, the polymer extrusion equipment may allow for removal of by-products formed during the extrusion process, such as those formed due to polycondensation reactions. Such by-products may include water (as steam) or other volatile matter present at the extrusion conditions. In other embodiments, the polymer extrusion equipment may be joined by at least one device for discharging the byproduct(s) formed during the extrusion process. Such device may be referred to as degassing device and may be connected via flow lines between the shearing screw assembly. Such device may consist of an outlet either at ambient pressures or sub-ambient pressures (or vacuum) in the 20 mbar to 900 mbar range, and preferably in the 150 mbar to 600 mbar range.

In some embodiments, the polymer extrusion equipment may allow for introduction of chemical additives, including the suitable catalysts and other additive packages, in the flow cavity during the extrusion process. In other embodiments, the polymer extrusion equipment may be joined by at least one device for introducing chemical additives in the flow cavity during the extrusion process. Such devices may be referred to as addition or injection devices and may be connected via flow lines between the shearing screw assembly.

In one embodiment, the addition or injection device may comprise of a chemical additive preparation/storage section, pneumatic or mechanical movement section, flow detection and control section, and a dispensing section that is interfaced with the internal flow cavity of polymer extrusion equipment. There is no limitation as to in what form the additive may be introduced; the liquid form is generally preferred for better transportability, flow control, dispersion and mixing. Also, in a non-limiting case, the additive may be maintained at elevated temperatures and introduced in its molten state. The addition or injection device may be referred to as liquid injection [LI] system in the case of liquid additive.

The skilled person will appreciate the fact that any chemicals addition at the throat of the extrusion device may be optional with the use of addition device interfacing with the internal flow cavity of polymer extrusion device.

In some embodiments, the polymer extrusion equipment may include one or more inlets for introducing dry, inert gaseous medium, such as nitrogen or argon. The inert gaseous medium may aid in the removal of any volatile matter (steam for example). In some embodiments the outlet may be downstream of the inlet. In some embodiments the outlet may be upstream of the inlet.

In one embodiment at the outlet of polymer extrusion equipment, an industrial quench system followed by granulation or polymer strand cutting system may be implemented. It is understood that the quench system and granulation/cutting system pace shall match with the production rate of the polymer extrusion equipment.

The following Examples demonstrate the present disclosure and its capability for use. The disclosure is capable of other and different embodiments, and its several details are capable of modifications in various apparent respects, without departing from the spirit and scope of the present disclosure. Accordingly, the Examples are to be regarded as illustrative in nature and non-limiting. Efforts have been made to ensure accuracy with respect to numbers (e.g., amounts, temperatures, etc.), but some errors and deviations should be accounted for. Unless indicated otherwise: parts are parts by weight, temperature is in ° C. and pressure is in atmospheres. Standard temperature and pressure are defined as 25° C. and 1 atmosphere.

Test Methods Used in the Examples

Polymer amine ends can be measured by directed titration with standardized perchloric acid solution of weighed polymer samples taken up in solution after filtration to remove the insolubles.

One method to determine the moisture regain of a polymer is measured by the following method. A sample (100 g) of the polymer is dried for 18 hours at 80° C. under vacuum. The initial moisture level of this dried polymer sample is preferably measured using an Aquatrac (PET version (4 Digit); Brabender Messtechnik) at 160° C. setting on about 1.9 g polymer. A moisture level measured using this method of less than 0.5 w % is taken to indicate that the polymer had been dried sufficiently.

The dried sample is then immersed in demineralized water (500 g) at ambient temperature (20° C.) without any agitation. After 48 hours a sample is removed (approx. 10 g) and patted dry with an absorbent tissue. A portion of the sample (approx. 5 g; weight of wet sample) is weighed accurately into a foil dish and placed in an oven at 80° C. under vacuum for 18 hours. The dish is removed and placed in a desiccator to cool, and then reweighed (weight left after drying). This procedure is repeated at intervals thereafter (e.g. 72, 144, 190 and 220 hours) up to 220 hours. Moisture uptake was determined by the following calculation:

$$\% \text{ Uptake} = \frac{[\text{weight of wet sample} - \text{weight left after drying}]}{[\text{weight of sample after drying}]} \times 100$$

The moisture regain of the polymer is defined as the moisture uptake after 220 hours or until the sample has reached moisture uptake equilibrium (which is defined as a weight change of no more than 1% in a 24 hour period), whichever is the earlier. Thus, if moisture uptake equilibrium has not been reached by 220 hours the moisture regain is the moisture uptake at 220 hours. When the moisture uptake equilibrium is reached before 220 hours, the moisture regain is the average (mean) of the moisture uptake for the first two consecutive measurements taken at equilibrium. By this test Nylon 66 flake without modification would have a moisture regain of about 8.5 w %.

An alternative test is to spin the nylon flake into yarn and by a similar method of immersion in water determine the equilibrium moisture uptake. A further alternative method is to spin the nylon flake into yarn and expose the yarn to a relative humidity [% RH] controlled atmosphere, say 50% RH at 23° C. and determine equilibrium moisture uptake. The purpose of these tests is to demonstrate improvement in moisture regain of the hydrophilic polyetheramine containing composition as against composition without the polyetheramine.

The color measurement is performed using CIE Lab technique. The color is measured with a Konica Minolta Chroma Meter CR-410 instrument. D65 illuminant is used with a CIE 1931 0° standard observer. The results are reported using the CIELAB color scale, wherein L* is a measure of brightness (L* of 100=white; L* of 0.0=black), a* is a measure of redness (+) or greenness (−) and b* is a measure of yellowness (+) or blueness (−). The term "YI" is the Yellowness Index color value that is measured by ASTM E313 method.

Test Equipment Used in the Examples

A twin-screw extruder [Coperion ZSK 18 MEGAlab] includes two conveying screws, 18-mm diameter with a 56L/D [i.e., L/D ratio of 56] co-rotating turning at the speed of 300 RPM that provide the high-shear, forward momentum to the heated mass inside the barrel. The processing section of the Coperion twin screw compounder ZSK 18 MEGAlab is set up to suit various process needs and to allow a wide variety of processes, for example, reaction polymerization and compounding processes. Polymer and additives are continuously fed into the first barrel section of the twin screw using a metering feeder. The products conveyed along the screw get melted and mixed by kneading elements in the plastification section of the barrel. The polymer then travels along to an injection port where liquids can be added and then onto degassing zones and from there to a pressure build zone where it then exits the die via a 3-mm hole as a lace. The cast lace is fed into a water bath to cool and to enable it to be cut into chips via a pelletizer.

The twin-screw extruder [TSE] includes several sequential zones; namely, a throat area for feeding the material, conveying and mixing the material, forward mass movement, polycondensation zone for polymer build, followed by transport out of the extruder screens and quenching of the polymer lace ad cutting into the pellets. An axial temperature profile across the extruder barrel is maintained in the range where the polycondensation reaction is most effective.

A liquid injection [LI] system is integrated into the extruder for feeding liquid additives. The LI system connection point to the extruder barrel is about in the middle section of its length. The LI system is enclosed within a cabinet inside which the temperature is controlled to keep the additives in flowable state and prevent line plugging due to solidification. The LI system is calibrated to deliver the desired feed flowrate corresponding to the target additive concentration in the polymer make.

EXAMPLES

The term "N66", as used herein, refers to a polymer synthesized by polycondensation of hexamethylenediamine (HMD) and adipic acid. The polymer is also known as Polyamide 66 (or PA66), Nylon 66, nylon 6-6, nylon 6/6 or nylon 6,6.

ELASTAMINE® RE-2000 amine, as used herein, is a commercial product of Huntsman International LLC. It is a water-soluble aliphatic polyetherdiamine with an approximate molecular weight of 2000.

Sodium hypophosphite Hydrate (CAS No. 123333-67-5; SHP; 98%), as used herein, is obtained from VWR International.

Potassium phenylphosphinate (CAS No. 16263-37-9; K-BZPA; 99.7%), as used herein, is obtained from BASF Intermediates.

Comparative Example A

This comparative example illustrates that when Elastamine® RE-2000 amine is added with the Nylon Salt, unacceptable foaming occurs during standard autoclave polymerization process.

For convenience of handling the waxy solid, Elastamine® RE-2000 amine is melted and diluted with water to give a room temperature pourable 80% mixture.

Salt Solution Preparation—

To the 20 L glass vessel (filled with nitrogen and purged with nitrogen) is added 4888 g water which is warmed to 35° C. Adipic acid (32 g, 0.22 mol) is added (calculated to balance amines ends that come from Elastamine® RE-2000) and the mix is stirred until dissolved. The above 80 wt % Elastamine® RE-2000 aqueous solution (547 g, 0.22 mol Elastamine® RE-2000 based upon a number average molecular weight of 2000) is added followed by Nylon 66 salt (4534 g, 17.3 mol), the mixture is left to stir until all solids have dissolved, to produce a roughly 50 wt % solution. A sample of the mix is taken and diluted to 9.5 wt % and its pH is determined to be 8.3. Small amounts of adipic acid are added to the 50 wt % solution until sample pH of 8.1 is achieved.

On conversion to polymer the polymer would contain about 10 wt % Elastamine RE 2000 (this excludes adipic acid used to balance) incorporated.

The polymerization process is conducted in a 15 L electrically heated autoclave equipped with a stirrer, pressure transducer and a pressure control valve through which volatiles could be vented, condensed and collected in a catch pot continuously being weighed for mass increase by load cells. The vessel is also equipped with thermocouples placed such that liquid phase and vapour phase temperatures could be determined. One of the vapour phase thermocouples is conveniently placed such that it is above the level of the liquid surface, where it would typically read a cooler temperature than the liquid, but should a foam develop and rise up and cover the vapour thermocouple then the temperature measured would increase to a value approaching that of the liquid.

Polymerization Process—

To the 15 L autoclave 9775 g of Salt solution prepared as above is added, together with a catalyst of Sodium Hypophosphite Hydrate (1.21 g, 11.4 mmol, equivalent to about 85 ppm P in final polymer), and 1.41 g of antifoam agent AF 1316 (ex ACC Silicones with 10% active ingredient, about 33 ppm in final polymer).

Evaporation Stage—

The autoclave is sealed and pressured/purged with Nitrogen (at 100 psia) three times. The contents are stirred at 200 rpm whilst heating commenced and the temperature of the contents are raised and steam pressure generated. When the autogeneous pressure has reached 170 psia stirring is reduced to about 70 rpm and the steam is vented through the control valve to maintain pressure at or below 170 psia, the temperature of the contents at this stage are about 189° C. The purpose of this stage is to increase the concentration of the salt solution to around 80-85 wt %

Cycle 1 Stage—

When 4.1 kg of condensate has been collected in the catch pot, which took about 30 minutes, at the end of which the liquid temperature is about 200° C., the vent valve is closed and the autogeneous pressure is allowed to rise (stirrer increased to 80 rpm). The liquid temperature rises to about 219° C. over about 18 minutes until the pressure reaches 265 psia. The vapor temperature is at about 211° C.

Cycle 2 Stage—

The control valve is kept at the pressure at 265 psia over about 39 minutes whilst the liquid temperature gradually rises until it has reached 243° C., and the vapor temperature is about 217° C.

Cycle 3 Stage—

The pressure is then allowed to fall over about 30 minutes to atmospheric pressure (about 15 psia), whilst stirring at 55 rpm, during which time the liquid temperature rises to about 267° C., and the vapor temperature is about 247° C.

Cycle 4 Stage—

After 13 minutes at atmospheric pressure a vacuum ramp is applied to reduce the pressure from atmospheric pressure to about 350 mbar over 15 minutes with the intention of keeping under full vacuum for a further 20 minutes. However, the pressure only drops from 15 psia to about 11.7 psia (about 800 mbar) over 5 minutes before the pressure starts to rise again. The vapor temperature rises sharply from about 250° C. to about 267° C. (only 10° C. cooler than the liquid temperature which is 277° C.)—this is taken as indicative of a foaming event. Eventually the pressure in the autoclave reaches about 25 psia by the end of cycle 4.

Cycle 5 Stage—

Valves to the vacuum system are closed and Nitrogen pressure (30 psia) is applied to the vessel and the polymer is cast. The Polymer has an RV of 27.3 and an AEG of 71.2 mpmg.

Later inspection of the vacuum lines confirms the lines had been blocked by polymer which would have occurred during the foaming event.

Example 1

A N66 polymer, having an RV of 34.8 and AEG of 56, is fed to the twin-screw extruder described above. A screw speed is maintained at 300 RPM. Upon establishing a stable temperature profile and operation of the extruder, a transparent lace of molten N66 is discharged from the extruder. Continuing under these conditions, molten Elastamine® RE-2000 polyetheramine (55-67° C. hot cabinet) is introduced in the extruder barrel through the LI connection port. The LI system is calibrated such that the delivered feed rate would yield about 8 wt % polyetheramine (Elastamine® RE-2000) incorporated into the polymer, based on the total composition.

The extruded polymer is visually opaque in appearance. The polymer is extruded at the die head of the extruder as a lace and quenched into a water bath to solidify before being fed into a cutter to produce fine pellets of about 3.0 mm×1.6 mm dimension. Significant foaming is not observed either at the vent port of the extruder of the die head of the extruder. The polymer has an RV 30.8, AEG of 115.8 mpmg, Color: L* 82.9, a* −1.46, b* 13.8, and YI of 29.7.

Example 2

About 5.0 kg/hr of N66 melt is fed to the twin-screw extruder feeder Zone 1, as described above. The N66 melt is supplied at about 283° C. and at about 9 bar gauge pressure. The barrel temperature profile in Deg. C is maintained as below:

|  | Zone | | | | | | | | | | | | |
| --- | --- | --- | --- | --- | --- | --- | --- | --- | --- | --- | --- | --- | --- |
|  | 2 | 3 | 4 | 5 | 6 | 7 | 8 | 9 | 10 | 11 | 12 | 13 | 14 |
| Set Point | 260 | 260 | 260 | 260 | 260 | 260 | 260 | 265 | 265 | 265 | 265 | 270 | 275 |
| Actual | 260 | 260 | 260 | 260 | 258 | 256 | 257 | 263 | 266 | 269 | 270 | 272 | 274 |

About 400 g of Elastamine® RE-2000 amine and about 29.2 g of adipic acid are melted together and about 100 ml of water is added to aid the adipic acid to react with the Elastamine® RE-2000 amine to form the salt. This mix is kept in a hot oven [operating at 70-101° C. temperature range] to evaporate off the water overnight. About 1.21 g of Sodium hypophosphite (SHP) is also added to this molten mix as a catalyst to aid reaction of the Elastamine® RE-2000-adipic acid salt with the molten nylon when introduced together. The catalyst remains as suspended in the molten mix.

Upon establishing the extruder conditions and obtaining a transparent lace of the starting molten N66, the above Elastamine® RE-2000 containing molten mix is introduced into the extruder using the LI system maintained in the 55-67° C. hot cabinet. The LI system is calibrated to give about 8 wt % polyetheramine (Elastamine®) concentration in the final polymer, based on the total composition.

The polymer is extruded as a lace and quenched into a water bath to solidify before being fed into a cutter at 57 RPM speed to produce fine pellets of about 3.0 mm×1.6 mm dimension. Foaming is not observed. The polymer has an RV of 25.6, AEG of 89.0 mpmg, Color: L* 84.6, a* −1.94, b* 12.7, and YI of 28.2.

Example 3

Example 2 is repeated except potassium phenylphosphinate is used as a catalyst to aid reaction of the Elastamine® RE-2000-adipic acid salt with the molten nylon when introduced together into the extruder. The polymer has Color: L* 88.2 a* −1.29, b* 5.36, and YI of 17.45.

Comparison of the b* and YI Color values clearly show improvements in the appearance of the product in terms of reduced yellowness.

While the illustrative embodiments of the disclosure have been described with particularity, it will be understood that various other modifications will be apparent to and may be readily made by those skilled in the art without departing from the spirit and scope of the disclosure. Accordingly, it is not intended that the scope of the claims hereof be limited to the examples and descriptions set forth herein but rather that the claims be construed as encompassing all the features of patentable novelty which reside in the present disclosure, including all features which would be treated as equivalents thereof by those skilled in the art to which the disclosure pertains.

What is claimed is:

1. A process for making polyamide comprising:
   a) feeding diacid and diamine to a first feed throat of a screw extruder, the screw extruder comprising a first melt zone and a first melt conveying zone downstream of the first feed throat;
   b) at least partially polymerizing the diacid and the diamine to form a first polyamide;
   c) feeding a polyetheramine additive to a second feed throat of the screw extruder downstream of the first melt conveying zone;
   d) incorporating the polyetheramine additive with the first polyamide in a second melt zone and a second melt conveying zone; and
   e) recovering a second polyamide from the screw extruder downstream from the second melt conveying zone, wherein:
      i) the RV of the second polyamide using the or ASTM D789 method is from about 20 to about 60; or
      ii) the amino end group (AEG) content is between about 15 mpmg and 130 mpmg;
   wherein
      the process further comprises feeding a second diacid to step (c) and incorporating the second diacid into the first polyamide in step (d), or
      the polyetheramine additive comprises one or more additives, or
      a combination thereof.

2. The process of claim 1 further comprising feeding a second diacid to step (c) and incorporating the second diacid into the first polyamide in step (d).

3. The process of claim 1 for making polyamide wherein, the polyetheramine additive is less thermally stable than the first polyamide.

4. The process of claim 1 for making polyamide wherein, the water regain of the second polyamide is greater than the water regain of the first polyamide.

5. The process of claim 1 for making polyamide wherein, the water regain of the second polyamide is >6 wt % to <30 wt %.

6. The process of claim 1 wherein the water regain of the second polyamide is from >10 wt % to <15 wt %.

7. The process of claim 1 for making polyamide wherein, the polyetheramine additive comprises one or more additives.

8. The process of claim 7 for making polyamide wherein the one or more additives comprise a catalyst.

9. The process of claim 8 for making polyamide wherein, the catalyst is chosen from a group consisting of phosphoric acid, phosphorous acid, hypophosphoric acid arylphosphonic acids, arylphosphinic acids, salts thereof, and mixtures thereof.

10. The process of claim 8 for making polyamide wherein, the catalyst is selected from a group consisting of sodium hypophosphite hydrate (SHP), manganese hypophosphite, sodium phenylphosphinate, sodium phenylphosphonate, potassium phenylphosphinate, potassium phenylphosphonate, hexamethylenediammonium bis-phenylphosphinate, potassium tolylphosphinate, and mixtures thereof.

11. The process of claim 1 further comprising adding an antioxidant or heat stabilizer to the first polyamide or the second polyamide.

12. The process of claim 11 wherein the antioxidant or heat stabilizer comprises a dicarboxylic acid.

13. The process of claim 12 wherein the dicarboxylic acid is adipic acid.

* * * * *